United States Patent
Didavide et al.

(10) Patent No.: US 10,800,006 B2
(45) Date of Patent: Oct. 13, 2020

(54) OPEN-PORE, CERAMIC-BONDED GRINDING TOOLS, METHOD FOR PRODUCING SAME, AND PORE FORMER MIXTURES USED TO PRODUCE SAME

(71) Applicant: REISHAUER AG, Wallisellen (CH)

(72) Inventors: Cristina Didavide, Reiden (CH); Matthias Müller, Graenichen (CH)

(73) Assignee: REISHAUER AG, Wallisellen (CH)

( * ) Notice: Subject to any disclaimer, the term of this patent is extended or adjusted under 35 U.S.C. 154(b) by 383 days.

(21) Appl. No.: 15/562,435

(22) PCT Filed: Mar. 3, 2016

(86) PCT No.: PCT/EP2016/054546
§ 371 (c)(1),
(2) Date: Sep. 28, 2017

(87) PCT Pub. No.: WO2016/155971
PCT Pub. Date: Oct. 6, 2016

(65) Prior Publication Data
US 2018/0085895 A1 Mar. 29, 2018

(30) Foreign Application Priority Data
Apr. 1, 2015 (CH) ........................ 0463/15

(51) Int. Cl.
*B24D 3/18* (2006.01)
*C04B 35/634* (2006.01)
(Continued)

(52) U.S. Cl.
CPC ............... *B24D 3/008* (2013.01); *B24D 3/18* (2013.01); *B24D 18/0009* (2013.01);
(Continued)

(58) Field of Classification Search
CPC . B24D 3/008; B24D 3/10; B24D 3/18; B24D 3/26; B24D 3/32; B24D 18/0009;
(Continued)

(56) References Cited

U.S. PATENT DOCUMENTS 2,342,121 A * 2/1944 Ciell .................... B24D 3/18
51/308
3,847,568 A 11/1974 Cihon et al.
(Continued)

FOREIGN PATENT DOCUMENTS

| AT | 152550 B | 2/1938 |
|---|---|---|
| CN | 1589189 A | 3/2005 |

(Continued)

OTHER PUBLICATIONS

International Preliminary Report on Patentability and Translation of Written Opinion from the International Bureau in counterpart International application No. PCT/EP2016/054546, dated Oct. 12, 2017.
(Continued)

*Primary Examiner* — Eileen P Morgan
(74) *Attorney, Agent, or Firm* — Sughrue Mion, PLLC

(57) ABSTRACT

In a method for producing open-pore, ceramic-bonded grinding tools, a pore former mixture consisting of at least two polymers having different firing curves, the maxima of which differ by at least 20° C., is used. The polymers are preferably thermoplastics that can be decomposed exclusively into $CO_2$ and water during combustion. The resulting grinding tool has a multimodal pore size distribution.

22 Claims, 1 Drawing Sheet

(51) Int. Cl.
*C04B 35/10* (2006.01)
*B24D 3/00* (2006.01)
*B24D 18/00* (2006.01)
*C04B 35/632* (2006.01)
*C04B 38/06* (2006.01)

(52) U.S. Cl.
CPC ............ *C04B 35/10* (2013.01); *C04B 35/632* (2013.01); *C04B 35/634* (2013.01); *C04B 38/0605* (2013.01); *C04B 2235/5427* (2013.01); *C04B 2235/77* (2013.01); *C04B 2235/96* (2013.01)

(58) Field of Classification Search
CPC ..... C04B 35/10; C04B 35/632; C04B 35/634; C04B 35/604; C04B 38/0605; C04B 2235/5427; C04B 2235/5436; C04B 2235/77; C04B 2235/96
USPC ................... 451/540, 541, 548; 51/293, 296
See application file for complete search history.

(56) References Cited

U.S. PATENT DOCUMENTS

| | | | | |
|---|---|---|---|---|
| 3,915,671 | A | * | 10/1975 | Kagawa .................. B24D 3/32 51/296 |
| 2003/0054154 | A1 | | 3/2003 | Chen et al. |
| 2003/0194947 | A1 | * | 10/2003 | Bright .................... B24B 5/363 451/28 |
| 2003/0232586 | A1 | | 12/2003 | Ramanath et al. |
| 2006/0137256 | A1 | * | 6/2006 | Yui ....................... B24D 18/00 51/295 |
| 2008/0222967 | A1 | | 9/2008 | Querel et al. |
| 2009/0311946 | A1 | * | 12/2009 | Jeevanantham ......... B24D 3/32 451/28 |
| 2010/0154315 | A1 | | 6/2010 | Wu et al. |
| 2010/0162632 | A1 | | 7/2010 | Zuyev et al. |
| 2011/0027564 | A1 | | 2/2011 | Francois et al. |

FOREIGN PATENT DOCUMENTS

| | | |
|---|---|---|
| CN | 102497959 A | 6/2012 |
| DE | 196 28 820 A1 | 1/1998 |
| DE | 202 21 728 U1 | 3/2007 |
| DE | 20 2010 015 210 U1 | 1/2012 |
| EP | 1 403 231 A1 | 3/2004 |
| EP | 1 839 720 A1 | 10/2007 |
| EP | 2 540 445 A1 | 1/2013 |
| GB | 2405410 A | 3/2005 |
| JP | 07267633 A | 10/1995 |
| JP | 0857768 A | 3/1996 |
| JP | 2002331461 A | 11/2002 |
| JP | 200353668 A | 2/2003 |
| JP | 2010-521326 A | 6/2010 |
| JP | 2012-200831 A | 10/2012 |
| JP | 2013508184 A | 3/2013 |
| WO | 02/07933 A1 | 1/2002 |
| WO | 2006/130759 A2 | 12/2006 |
| WO | 2008/112899 A2 | 9/2008 |
| WO | 2011/056671 A2 | 5/2011 |
| WO | 2016/089915 A1 | 6/2016 |
| WO | 2017/050755 A1 | 3/2017 |

OTHER PUBLICATIONS

Office Action of German Application No. 10 2015 115 953.8, dated Aug. 4, 2016.
International Search Report for PCT/EP2016/054546 dated May 30, 2016 [PCT/ISA/210].
Written Opinion for PCT/EP2016/054546 dated May 30, 2016 [PCT/ISA/237].
Communication dated Dec. 12, 2018, from the State Intellectual Property Office of the P.R.C in counterpart application No. 201680020958.4.
Communication dated Oct. 15, 2018 from the Japanese Patent Office in counterpart application No. 2017-550815.
The Second Office Action dated Sep. 30, 2019 issued by the China National Intellectual Property Administration in counterpart application No. 201680020958.4.
Notification of Reason for Refusal dated Oct. 29, 2019 issued by the Japanese Patent Office in counterpart application No. 2017-550815.
Communication dated Dec. 27, 2019 from Japanese Patent Office in JP Application No. 2017-550815 forwarding third party submission dated Dec. 6, 2019. (original and translation).

* cited by examiner

OPEN-PORE, CERAMIC-BONDED GRINDING TOOLS, METHOD FOR PRODUCING SAME, AND PORE FORMER MIXTURES USED TO PRODUCE SAME

CROSS REFERENCE TO RELATED APPLICATIONS

This application is a National Stage of International Application No. PCT/EP2016/054546 filed Mar. 3, 2016, claiming priority based on Switzerland Patent Application No. 00463/15 filed Apr. 1, 2015, the contents of all of which are incorporated herein by reference in their entirety.

TECHNICAL FIELD

The present invention relates to a method for producing open-pore, ceramic-bonded grinding tools, and also to pore formers suitable for this method, the pore formers used being a pore former mixture comprising at least two polymers. Furthermore, the present invention also relates to open-pore, ceramic-bonded grinding tools producible by the method of the invention.

PRIOR ART

Ceramic-bonded grinding tools are used in industry particularly for surface machining. To produce the grinding tools, abrasive grains, examples being those based on aluminum oxide, silicon carbide, diamond or CBN, are processed to a mixture with a binder and optionally further additives, such as fillers, active abrasives, pore formers or temporary adhesives, for example, and this mixture is then pressed to give the desired shape. The green compact formed in this operation is subsequently dried, freed from the added pore formers, optionally at appropriate temperatures, and then subjected to ceramic firing.

Depending on the intended use, the grinding tools have a certain porosity, with the pores being intended to allow efficient use of cooling lubricants and the accommodation and removal of grinding wastes, allowing a high degree of material depletion with a low thermal load on the workpiece. It is customary to add synthetic pore formers to the mixture, these being substances which can be removed from the green compact at low temperatures by evaporation, sublimation or burning. The most well-known and still the most widely used pore former for ceramic-bonded grinding tools is naphthalene, which can be removed by sublimation at as low as around 80° C. The use of naphthalene is considered a disadvantage in terms in particular of the toxicity and also, above all, of the intense characteristic intrinsic odor, meaning that not only the workers at the production sites but also the residents are affected, and their health jeopardized, by the air given off. In spite of corresponding elaborate and expensive protective measures, pollution and jeopardizing of the environment cannot be avoided entirely when naphthalene is used.

In the past, therefore, numerous attempts have been made to replace naphthalene with alternative pore formers, such attempts having frequently failed, however, because these alternative substances do not exhibit, or not adequately, the positive qualities required for the production of ceramic-bonded grinding tools, such as, for example, low rebound after shaping, good mixing behavior, low swelling tendency in connection with the liquid wetting systems, stable, homogenous distribution and low separation tendency in the finished compound, and removal by burning with little heat given off and as far as possible no residue.

EP 2 540 445 A1 describes a method for producing a tool from bonded abrasives where the pore formers used comprise dicarboxylic acids and also mixtures of dicarboxylic acids and hydrates of dicarboxylic acids. A disadvantage of that method is that the decomposition of the dicarboxylic acids liberates considerable volumes of gas, which may cause mechanical damage to the green compact, a possibility which has to be avoided by means of a time-consuming and costly temperature regime. Additionally, moreover, the dicarboxylic acids have to be pelletized at relatively high cost and complexity, with addition of binders, in order to allow them to be employed readily in the mixture for the green compacts, and this additionally complicates the production of the grinding tools and adds to the expense.

DE 196 28 820 A1 describes a method for producing porous ceramic products, where the ceramic compound is admixed with non-deformable acrylate glasses which are not soluble or swellable in the compound and which are present in the solid state, these glasses being composed of polyacrylic esters or polymethacrylic esters which can be classified in defined grades, as pore formers which are removable by firing. A disadvantage of the method described in the above document is that the combustion products and decomposition products of the acrylate glass on firing are released within a narrow temperature interval, thereby giving rise to an extremely severe short-term load on the incineration units used for the cleaning of the outgoing gases; this extremely severe short-term load carries with it the risk of incomplete combustion and hence of pollution of the environment. A further factor is that even polyacrylates do not burn entirely without odor, a fact which is adversely manifested especially when relatively large quantities are combusted suddenly. Furthermore, the risk exists that the large volumes of gas released in a short time during the removal of the pore former by burning will generate forces, possibly damaging the grinding tools.

German utility model DE 20 2010 015 210 U1 discloses the use of thermoplastic granules as innovative pore formers. The publication does not reveal any details of which thermoplastic material is to be used or how these thermoplastic granules are to be employed.

SUMMARY OF THE INVENTION

There is therefore still a need for a pore former and a method for producing open-pore grinding tools that overcomes the disadvantages of the prior art.

The object is achieved by means of a method for producing open-pore, ceramic-bonded grinding tools using a pore former mixture which comprises polymers having at least two different firing curves. The maxima of at least two firing curves of the different polymers differ by at least 20° C., the maxima of the firing curves of all the polymers in the mixture being in each case below 750° C.

The concept of the firing curve refers here to the emissions profile which represents the variable emission concentrations of the substances removed by burning over the time course and temperature course of firing in the oven, as for example over the time course of oven firing with a linear temperature increase.

Through the use of a mixture of several polymers having different firing curves, success is achieved in extending the release of the pore formers over a relatively large time interval, allowing the problems described above—of the short-term overloading of the incineration unit and the damage to the grinding tools—to be overcome.

Preference is given to using polymers whose combustion products in the case of complete combustion consists essentially of carbon dioxide and water, allowing the problems of development of odor and of health jeopardization to be resolved as well. A prerequisite in this case is that the CO likewise formed in the combustion is reacted further to form $CO_2$.

In one particularly advantageous embodiment of the present invention, a mixture of three polymers is used as pore former, thus allowing the firing curve of the mixture to be further optimized and extended, so that the problems described above can be eliminated even more effectively.

Provided with preference for the pore former mixture are polymers from the group of the thermoplastics, although thermosets are also suitable as pore formers if they decompose within the temperature range described above and if the decomposition products can be burnt exclusively to give off carbon dioxide and water at below 750° C.

The qualities required above may be realized especially when different thermoplastic polymers are selected from the group consisting of polylactide (PLA), polyacrylate (PMMA), polyethylene (PE), polypropylene (PP), polyvinyl acetate (PVA), polyvinyl butyral (PVB), and polyketone (PK), with one particularly advantageous mixture containing less than 50 vol % of polyacrylate.

The pore former mixture, however, ought not only to have a firing curve which extends over a relatively wide temperature interval, but should also have the other positive qualities required of a pore former for ceramic-bonded grinding tools, such as, for example, good mixing behavior and low swelling tendency, homogeneous, stable distribution and low separation in the finished compound, low rebound when the composition is pressed, and low burden on the environment and on the workplace.

Hence it has been found that in the case of one preferred embodiment of the present invention, at least one of the thermoplastic polymers has crystalline regions, thereby improving the pressability of the compound.

A particularly advantageous embodiment of the present invention has been found with a mixture of thermoplastic polymers as pore formers, the pore former mixture comprising 20 to 80 vol % of polyethylene, 10 to 50 vol % of polyacrylate, and 10 to 50 vol % of either polylactide, polyvinyl acetate or polyvinyl butyral, and preferably consisting only of these constituents.

During the course of the investigations of different polymer mixtures it was additionally found that the firing curves of the mixtures have a profile which is different from the firing curves of the individual polymers and which is not a simple superimposition of the firing curves of the individual polymers.

A production method of the invention for producing open-pore, ceramic-bonded grinding tools comprises:
 mixing abrasive grains with a ceramic binder, a pore former mixture of the aforesaid kind, and auxiliaries (e.g. adhesive and further additives) to give a mixture;
 pressing a green body from the mixture; and
 firing the green body to form a ceramic-bonded grinding tool.

The mixing may be accomplished in particular by introducing the abrasive grains to be used for the grinding operation (preferably in a defined grain size) and initially mixing them with a powderous binder. A liquid temporary adhesive is then added to the mixture, this adhesive being used to fix the ceramic binder, added in powder form, on the surface of the abrasive grain. As a temporary adhesive it is possible, for example, to use dextrin. Subsequently, the pore formers and other additives are added, with the pore formers and the abrasive grains being used in solid form in a defined grain size, which corresponds to the size of the desired pores and preferably approximately in the grain size range of the abrasive grains employed.

The shape of the polymer particles used in accordance with the invention is advantageously also adapted to the shape of the abrasive grains. The polymer particles are preferably used as cubic or spherical particles. Other additives employed are, in particular, fillers, abrasive auxiliaries, wetting agents, and surfactants, whose purposes include that of adjusting the rheology of the compound in such a way as to enable and/or facilitate its pressing to form a homogeneous green compact.

Further advantageous embodiments of the method of the invention involve mixing the pore former mixture with a temporary adhesive before introducing it into the compound, hence likewise allowing an improvement in the homogeneity of the grinding tool; very generally, it is useful if the firing temperature of the adhesive is higher than that of the pore formers, so that the adhesive is burnt only after the pore formers have been removed.

As part of the development work for the innovative pore former, it was found that when a mixture of thermoplastic polymers is used as pore formers, grinding tools can be obtained that have enhanced homogeneity and a greater grinding performance. In view of the improved homogeneity of the grinding tools, it is possible to produce abrasive disks with greater volumes, thereby additionally improving the productivity.

In one particularly advantageous embodiment of the present invention, the polymer mixture is used in a defined, multimodal grain size distribution, thus allowing a defined pore space with different pore sizes to be obtained specifically in the grinding tool, this pore space being optimized for the particular grinding operation, with the size of the pores adapted to the waste that is formed during the grinding operation and to the coolant demand. The different polymers here are employed preferably each as pellets with a narrow grain fraction in a grain size range between 0.05 and 2 mm.

The grain sizes are obtained in accordance with ISO 8486 by a screen analysis on the basis of the clear mesh size of the screen (FEPA standard is based on the number of meshes per inch). The grain size is therefore defined according to the clear dimension of the mesh square of the screen. Accordingly, the grain is assumed de facto to be spherical, and the maximum assumed diameter of the grain is therefore smaller than the clear mesh size of the screen. Since screening processes proceed by subsequent passing of the screening material over a number of sieves with a mesh size becoming gradually smaller, all of the grains with an apparent diameter smaller than the clear mesh size of the screen in question pass through the screen under consideration, and are held on the subsequent screen with the next-finer mesh size, provided that the grain diameter in that case is greater than the clear mesh size of this subsequent screen. What this means is that a screen fraction has grain size ranges which are greater than the clear mesh size of the subsequent screen and less than the clear mesh size of the screen under consideration (example: 125 . . . 180 mm). A grain size according to ISO 8486 contains fractions from a plurality of screens.

The grain size distribution has a distribution function (e.g., Gaussian distribution). The mean of the grain size distribution, which is subject to the condition that 50% of the grains are larger than the mean and, consequently, 50% of the grains are smaller than the mean, is called the d50.

These definitions apply equally to the size of the pore former grains and to the size of the abrasive grains.

The pore former mixture preferably has a multimodal grain size distribution with at least two grain size maxima in the range between 100 and 1000 μm. When a pore former mixture having a bimodal grain size distribution is used, the average grain size d50 of the fine fraction is preferably between 100 and 400 μm and the average grain size d50 of the coarse fraction between 350 and 1000 μm.

For a pore former mixture having a trimodal grain size distribution, the average grain size d50 of the fine fraction is advantageously between 100 and 300 μm, the average grain size d50 of the medium fraction between 250 and 450 μm, and the average grain size d50 of the coarse fraction between 400 and 1000 μm.

A multimodal grain size distribution contains different grain sizes which differ significantly in terms of grain size, and so the maxima of the distribution curves (e.g., Gaussian distribution curves) may form separately.

Generally it may be observed that the average grain sizes d50 of the individual pore former fractions are preferably at least 100 μm apart.

When pore former mixtures are used that have a multimodal distribution of the pore formers, the resulting abrasive disks likewise have a multimodal pore size distribution, with the pores having an average diameter of between 50 and 2000 μm. It has been found that open-pore, ceramic-bonded grinding tools having a specific multimodal pore size distribution have advantages versus the conventional grinding tools, since in this way it is possible to adapt the grinding tool optimally to the grinding conditions. The advantages are reflected in particular in high depletion performance in conjunction with cool grinding.

The open-pore, ceramic-bonded grinding tools of the invention possess a pore fraction of between 20 and 80 vol % and preferably have a multimodal pore size distribution with at least two pore size maxima in the range between 100 and 1000 μm.

The definition of the pore size and, respectively, of the pore size distribution corresponds to the definition stated above for a grain size and the grain size distribution, respectively, if the pores are understood as negative impressions of grains. A multimodal pore size distribution, correspondingly, contains different pore sizes which differ significantly in terms of pore size, and so the maxima of the distribution curves (e.g., Gaussian distribution curves) may form separately.

The pore size distribution of the pores which are produced with a pore former mixture of given grain size distribution correlates closely with the grain size distribution of the pore formers. Correspondingly, the mean of the pore size distribution also correlates closely to the mean of the grain size distribution.

The pore fraction is the ratio between the pore volume, which is composed in its entirety of the natural pore space owing to the interstices between the abrasive grains, owing to the natural grain bed and the artificial pore space which is generated by pore formers, to the total volume of the grinding tool.

The pore size distribution and the pore fraction may be determined by microscope analysis of sections of the grinding tool, by means of suitable software.

In one advantageous embodiment of the present invention, the grinding tool possesses a bimodal pore distribution, with the maximum of the fine pores being between 100 and 400 μm and the maximum of the coarse pores between 350 and 1000 μm A further advantageous embodiment provides grinding tools having a trimodal pore distribution, with the maximum of the fine pores being between 100 and 300 μm, the maximum of the medium pores between 250 and 450 μm, and the maximum of the coarse pores between 400 and 1000 μm.

The maxima of the pore size distribution are preferably at least 100 μm apart.

BRIEF DESCRIPTION OF THE DRAWINGS

Preferred embodiments of the invention are described below with reference to the drawings, which serve solely for elucidation and should not be interpreted restrictively. In the drawings.

DESCRIPTION OF PREFERRED EMBODIMENTS

Figure 1:
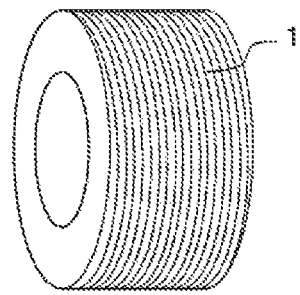
FIG. 1 shows an exemplary ceramic-bonded grinding tool.

FIG. 1 shows on an exemplary basis a ceramic-bonded grinding tool in the form of a grinding worm for the hard precision machining of gearing systems. The invention, however, is not confined to such grinding worms, but can instead be applied to any kinds of ceramic-bonded grinding tools.

Figure 2:
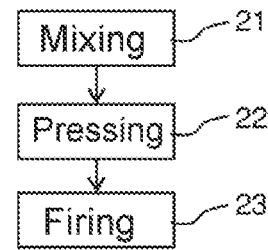
FIG. 2 shows a highly schematic flow plan of a method for producing an open-pore, ceramic-bonded grinding tool.

FIG. 2 illustrates a simplified flow plan for the production of a ceramic-bonded grinding tool. First of all, abrasive grains, a ceramic binder, a pore former mixture, and optionally adhesives and additives are mixed (step 21). The resulting compound is subsequently removed from the mixer, sieved, placed into a mold, and pressed using a hydraulic press (step 22). The resulting green compact is fired in an oven (step 23).

Figure 3:
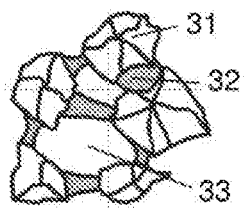
FIG. 3 shows a highly schematized diagram of the microstructure of an open-pore, ceramic-bonded grinding tool.

The microstructure of a grinding tool fabricated in this way is illustrated in highly schematic form in FIG. 3. The abrasive grains 31 are connected by binding bridges 32, consisting of the ceramic binder. In between there is a multiplicity of pores 33 of different sizes. The mixture of abrasive grains 31, binding bridges 32, and pores 33 forms a three-dimensional open network (not visible in the sectional representation of FIG. 3). The shape, size, and size distribution of the pores are heavily dependent on the pore former mixture selected.

The pores generated artificially using pore formers possess an irregular shape, which derives from the geometry of the pore formers and also of the adjacent abrasive grains, but which may be described approximately as spherical. Their size may therefore be characterized by their average diameter. Size figures for pores are always based hereinafter on the average diameter as determined by electron microscopy. The abrasive grains likewise have an arbitrary, usually irregularly polyhedral form, but one which is usually likewise approximated by the spherical description. The abrasive grain size can be described in the usual way by the abrasive grain diameter, which in the case of screened grades must be smaller than the clear mesh size of the screen. Size figures for abrasive grains are always based below on the abrasive grain size as determined by screening. Similarly, size figures and size distributions for pore formers are always based on the sizes determined by screening.

Pore Formers Used

Table 1 compiles a number of pore formers which were used in the context of the present studies. The selected grain size distribution of the pore former is based on the average diameter of the abrasive grain DK and may be calculated therefrom using a factor Fx which is typical of the respective pore former. If, for example, the abrasive grain diameter is $D_K=200$ μm and the factor $F_x=2.0\pm1.0$, then according to this definition the grain size distribution of the pore former is $F_x*D_K=(400\pm200)$ μm. The number after the "±" here designates twice the standard deviation of the grain size distribution relative to the mass; in other words, 95 percent by mass of the pore former in question has a grain size within the specified interval. The grain size distribution of each individual pore former was monomodal and approximately Gaussian, with a pronounced maximum at the point indicated.

TABLE 1

| Pore Former | Grain Size $F_x*DK$ | Firing curve maximum (° C.) | Fx |
|---|---|---|---|
| Polyethylene | F1*DK | 120-340 | 2.0 ± 1.0 |
| Polyacrylate | F2*DK | 230-250 | 1.5 ± 0.5 |
| Polylactide | F3*DK | 180 | 2.0 ± 1.0 |
| Polyvinyl butyral | F4*DK | 195 | 1.0 ± 0.5 |

To form the pore former mixtures A, B, and C the solids listed in table 1 above were mixed thoroughly with one another in a mixer, in each case in the ratios reported in table 2. For comparison with the prior art, 100% naphthalene was used as pore former in example D.

TABLE 2

| | Mixture (wt %) | | | |
|---|---|---|---|---|
| Pore former | A | B | C | D |
| Polyethylene | 40 | 31 | 33 | — |
| Polyacrylate | 41 | 33 | 37 | — |
| Polylactide | 19 | 23 | 19 | — |
| Polyvinyl butyral | — | 13 | 11 | — |
| Naphthalene | — | — | — | 100 |

Production of the Grinding Disks

For all of the disks tested, the same raw material constituents, reproduced in table 3, were used, which means that the grinding test permits a direct comparison of the individual pore former mixtures, with the amounts of the individual components being based in each case on the abrasive grain amount (100%).

TABLE 3

| Raw material | Characterization | Amount (wt %) |
|---|---|---|
| Abrasive grain | corundum ($D_K$ = 190 μm) | 100 |
| Adhesive | polymer solution | 2.05 |
| Additives | various additives | 2.79 |
| Pore former | A, B, C or D | 5.07 |

The components were introduced into a drum mixer and mixed in 23 mixing steps for approximately 60 minutes until in visual terms the compound displayed a certain homogeneity and pourability. The compound was subsequently removed from the mixer and sieved. The sieved compound was placed into a mold and pressed form-fittingly with a hydraulic press at pressures of 30 bar. The green compact thus obtained had dimensions (diameter×bore×height) of 280×128×157 mm and were fired to a maximum temperature of 1150° C. in an electric oven with a firing program selected such that the quantities of off-gas over a period of 50 hours have relatively uniform distribution, with off-gas maxima being measured, by means of a flame ionization detector, after about 8 hours, about 22 hours, about 35 hours, about 45 hours, and about 50 hours.

In the processing of the compounds up to the firing of the disks, no odor was found to be given off in the case of specimens A, B, and C, whereas specimen D, even during mixing and pressing, had the extremely strong and unpleasant odor of moth powder and tar that is characteristic of naphthalene. In the course of the temperature treatment, in which first of all the pore former is burnt, a slight, but not unpleasant, waxlike odor was found in the case of specimens A-C. The burning of the specimen disk D was again accompanied by an extremely strong odor nuisance.

Grinding Tests

The completed grinding disks had the properties described in table 4 below. In order to test the disks, determinations were made in a first step of the limiting time cutting volume or the equivalent limiting cut thickness $h_{eq\_th}$ until grinding burn occurred, and in a second step of the limiting time cutting volume or equivalent limiting cut thickness $h_{eq\_v}$ relating to the exceedance of the permissible wear limit. Both values are recorded as relative values, based on a comparison disk, likewise in table 4.

TABLE 4

| Sample | A | B | C | D |
|---|---|---|---|---|
| Dimensions (mm) | 275 × 125 × 160 | 275 × 125 × 160 | 275 × 125 × 160 | 275 × 125 × 160 |
| Weight (g) | 9440 | 9150 | 9215 | 9308 |
| Density (g/cm3) | 1.875 | 1.860 | 1.871 | 1.891 |
| Grinding burn limit (%)* | 115 | 109 | 104 | 97 |
| Wear limit (%)** | 112 | 108 | 98 | 101 |

*Grinding burn limit - maximum attainable equivalent cutting thickness $h_{eq\_th}$ which can be employed without grinding burn, i.e., without thermomechanical edge-layer damage.
**Wear limit - maximum attainable equivalent cutting thickness $h_{eq\_v}$ which can be employed while staying within a mandated wear criterion.

The disks were tested on a Reishauer RZ 260 machine, using cooling oil and a diamond dressing tool. The workpiece selected was a test wheel made from the material 16MnCr5. Investigated in parallel was a comparison disk as reference variable (100%), in order to rule out possible effects of the workpiece batch.

In the grinding burn test, operation took place in three stages with three leveling strokes, a roughing stroke and a finishing stroke, by systematic enlargement in the axial advance (Z-advance) with otherwise identical cutting values and cutting conditions. In this way, a uniform delivery was ensured in the $2^{nd}$ stage for the roughing stroke. Verification of grinding burn took place after the finishing stroke ($3^{rd}$ stage) by means of Nital etching.

The wear test was carried out with a comparable technology, operating with variable Z-advance in the roughing stroke in the $2^{nd}$ stage, and determining the wear after the finishing stroke ($3^{rd}$ stage) in the utilization region of the grinding worm during the roughing stroke. The performance limit is reached on exceedance of a dimensional deviation of the profile $f_{ff}$>6 µm at a mandated grinding speed.

A high wear resistance reduces the frequency of dressing and increases the number of workpieces which can be ground in one dressing cycle, thereby boosting the productivity.

The conditions in relation to the development of odor that were found in the processing of the compounds A, B, and C, and also the mechanical, physical, and chemical processing qualities, make it clear that the polymer mixtures used are outstandingly suitable as pore formers. All three specimens according to the invention exhibit low rebound after shaping, good mixing behavior, no swelling tendency in connection with the liquid wetting systems, and a low separation tendency in the finished compound. A particularly positive feature is the firing behavior, which features low exothermic heat production and is distributed over a wide temperature range, meaning that no instances of damage to the disks were recorded in the course of firing.

In view of the specific use of the different polymers having different grain sizes, it is possible to obtain grinding tools having a homogeneous multimodal pore distribution, which is optimized not only for the accommodation of cuttings but also for flushing with the coolant. At the same time, in this way, the hardness of the disk can be optimized. The positive effect on the grinding behavior is evident both in the grinding burn test and in the wear test, in which the grinding disks according to the invention score up to 15% better than the standard or the conventional disk fabricated using naphthalene.

Figure 4:
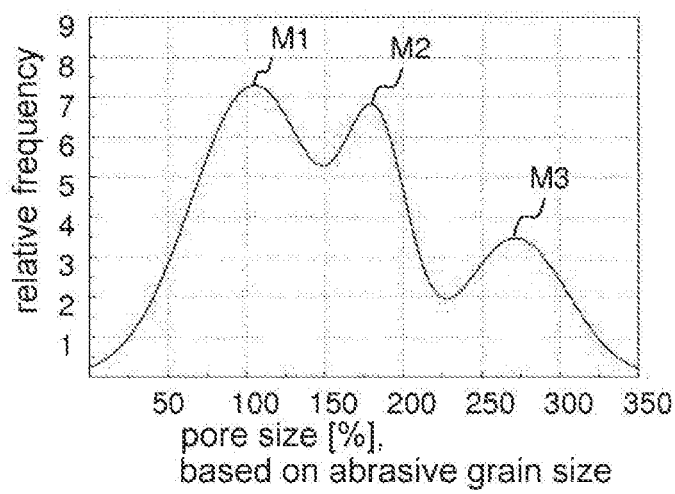
FIG. 4 shows a trimodal pore size distribution.

A typical multimodal pore size distribution is shown in FIG. 4 for example A. To determine the pore size distribution, sections of the surface of a grinding disk were embedded in epoxy resin, polished, and analyzed by means of a scanning electron microscope, using the "Imagic" software for the image analysis. When carrying out the determination, the only pores considered were those with not more than 10% deviation from the circular form (ratio of maximum diameter to minimum diameter). Interpolation of the results produced a trimodal distribution having a maximum M1 at a reference pore size, relative to the average abrasive grain size, of around 100%, with fractions of artificial and natural pores, and two further maxima M2 and M3 at about 175% and 225%, which originate exclusively from artificial pores. For the pore size determination itself, the average pore diameter was employed.

The invention claimed is:

1. An open-pore, ceramic-bonded grinding tool having a pore fraction of between 20 and 80 vol %, the pores having an average diameter of between 50 and 2000 µm, wherein the grinding tool has a multimodal pore size distribution having at least two pore size maxima, and wherein the pore size maxima of the pore size distribution are at least 100 µm apart.

2. The grinding tool as claimed in claim 1, wherein at least two of the pore size maxima are in the range between 100 and 1000 µm.

3. The grinding tool as claimed in claim 1, wherein the grinding tool has a bimodal pore size distribution with fine pores and coarse pores, the fine pores forming a pore size maximum of between 100 and 400 µm, and the coarse pores forming a pore size maximum of between 350 and 1000 µm.

4. The grinding tool as claimed in claim 1, wherein the grinding tool has a trimodal pore distribution with fine pores, medium pores and coarse pores, the fine pores forming a pore size maximum of between 100 and 300 µm, the medium pores forming a pore size maximum of between 250 and 450 µm, and the coarse pores forming a pore size maximum of between 400 and 1000 µm.

5. A pore former mixture for producing open-pore, ceramic-bonded grinding tools, the pore former mixture comprising at least two different pore-forming polymers, wherein the at least two different pore-forming polymers have different firing curves, each of the firing curves having a maximum, the maxima of the firing curves of at least two of the pore-forming polymers differing by at least 20° C., and the maxima of the firing curves of all the pore-forming polymers being below 750° C.

6. The pore former mixture as claimed in claim 5, wherein the combustion products of the pore-forming polymers comprise exclusively carbon dioxide and water.

7. The pore former mixture as claimed in claim 5, wherein the pore former mixture comprises at least three different pore-forming polymers.

8. The pore former mixture as claimed in claim 5, wherein the pore-forming polymers are selected from the group of thermoplastics and thermosets.

9. The pore former mixture as claimed in claim 8, wherein the pore-forming polymers are thermoplastics selected from the group consisting of polylactate (PLA), polyacrylate (PMMA), polyethylene (PE), polypropylene (PP), polyketone (PK), polyvinyl acetate (PVA), and polyvinyl butyral (PVB).

10. The pore former mixture as claimed in claim 5, wherein at least one of the pore-forming polymers is a thermoplastic and has crystalline regions.

11. The pore former mixture as claimed in claim 5, wherein the pore former mixture comprises 20 to 80 vol % of polyethylene, 10 to 50 vol % of polyacrylate, and 10 to 50 vol % of polylactate, polyvinyl acetate or polyvinyl butyral.

12. The pore former mixture as claimed in claim 5, wherein the individual pore-forming polymers are each present as a pore former fraction in a grain size range of between 0.05 and 2 mm, the pore former mixture having a multimodal grain size distribution.

13. The pore former mixture as claimed in claim 12, wherein the multimodal grain size distribution has at least two grain size maxima in the range between 100 and 1000 µm.

14. The pore former mixture as claimed in claim 12, wherein the pore former mixture has a bimodal grain size distribution with a fine fraction and a coarse fraction, the fine fraction having an average grain size d50 of between 100 and 400 µm, and the coarse fraction having an average grain size d50 of between 350 and 1000 µm.

15. The pore former mixture as claimed in claim 12, wherein the pore former mixture has a trimodal grain size distribution with a fine fraction, a medium fraction and a coarse fraction, the fine fraction having an average grain size d50 of between 100 and 300 µm, the medium fraction having an average grain size d50 of between 250 and 450 µm, and the coarse fraction having an average grain size d50 of between 400 and 1000 µm.

16. The pore former mixture as claimed in claim 12, wherein the pore former fractions have different average grain sizes d50, the average grain sizes d50 of the individual pore former fractions being at least 100 µm apart.

17. A method for producing open-pore, ceramic-bonded grinding tools, using a pore former mixture comprising at least two pore-forming polymers, wherein the at least two different pore-forming polymers have different firing curves each of the firing curves having a maximum, the maxima of the firing curves of at least two of the pore-forming polymers differing by at least 20° C., and the maxima of the firing curves of all the pore-forming polymers of the pore former mixture being below 750° C.

18. The method as claimed in claim 17, wherein the pore former mixture is added directly to a press compound for producing the grinding tool.

19. The method as claimed in claim 17, wherein the pore former mixture is added in combination with at least one adhesive to the press compound.

20. The method as claimed in claim 19, wherein the adhesive has a firing temperature which is higher than the maxima of the firing curves of the pore-forming polymers.

21. An open-pore, ceramic-bonded grinding tool having a pore fraction of between 20 and 80 vol %, the pores having an average diameter of between 50 and 2000 µm, wherein the grinding tool has a bimodal pore size distribution with fine pores and coarse pores, the fine pores forming a pore size maximum of between 100 and 400 µm, and the coarse pores forming a pore size maximum of between 350 and 1000 µm.

22. An open-pore, ceramic-bonded grinding tool having a pore fraction of between 20 and 80 vol %, the pores having an average diameter of between 50 and 2000 µm, wherein the grinding tool has a trimodal pore distribution with fine pores, medium pores and coarse pores, the fine pores forming a pore size maximum of between 100 and 300 µm, the medium pores forming a pore size maximum of between 250 and 450 µm, and the coarse pores forming a pore size maximum of between 400 and 1000 µm.

* * * * *